Dec. 31, 1963 E. W. PEARSON ETAL 3,115,801
SHEAR MACHINE AND BACK GAUGE ASSEMBLY THEREFOR
Filed June 15, 1959 2 Sheets-Sheet 1

INVENTORS
EUGENE W. PEARSON
ROLLAND A. RICHARDSON
GERALD I. CLARK
BY Bruce & Brosler
THEIR ATTORNEYS

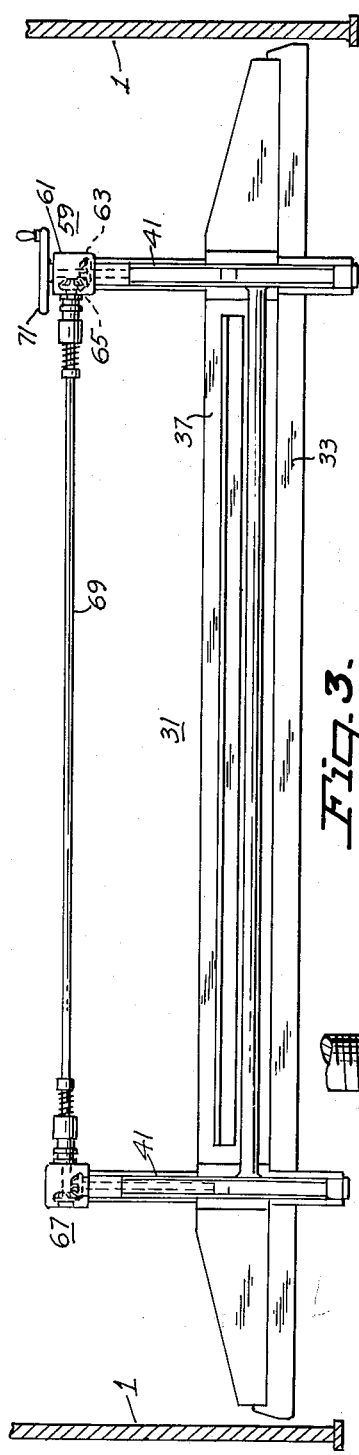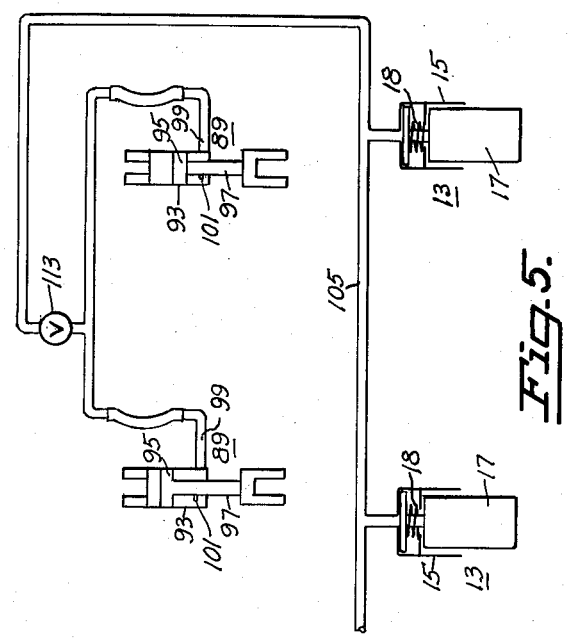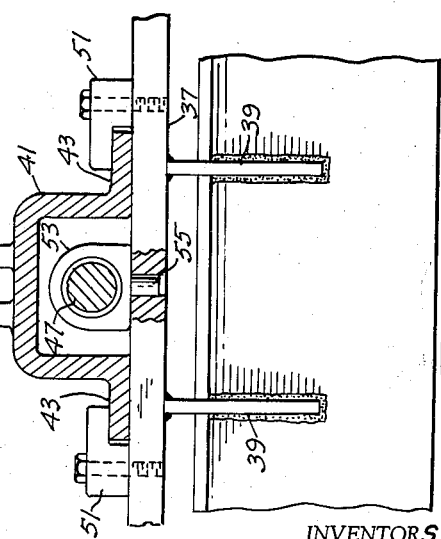

United States Patent Office 3,115,801
Patented Dec. 31, 1963

3,115,801
SHEAR MACHINE AND BACK GAUGE
ASSEMBLY THEREFOR
Eugene W. Pearson, Orinda, Rolland A. Richardson, Alameda, and Gerald I. Clark, Moraga, Calif., assignors to Pacific Industrial Manufacturing Co., a corporation of California
Filed June 15, 1959, Ser. No. 820,248
13 Claims. (Cl. 83—375)

Our invention relates to shear machines and the like, and more particularly to a back gauge assembly for such machines and will be described in its application to a machine of the shear type.

A conventional type shear machine involves a fixed knife and a movable cooperating knife affixed to the lower edge of a reciprocal ram assembly and at an angle to the horizontal, termed a rake angle, whereby the movable knife exhibits a slicing or progressive shearing action with respect to the fixed knife. A work table supported with one edge along the fixed knife facilitates the positioning of the work and supports the same during shearing.

Hold-down means are normally employed to clamp the work to the table after the work has been properly positioned thereon for the desired cut.

In positioning the work on the table, back gauge assemblies have previously been utilized. Such gauge assemblies were affixed to the ram assembly with provision for adjusting the back gauge element so as to provide for different sized cut-offs.

In shearing metal plate, and more particularly when cutting off narrow strips from heavy gauge plate, quite frequently the cut-off portion jams itself securely between the fixed knife and the back gauge element, with great probability of springing the back gauge or otherwise causing damage to the machine.

On analyzing the reason for such jamming, it is believed due to the fact that the progressive shearing causes the strip as it forms, to curl downwardly, and at the same time exhibit a twisting or spiraling action. The downward curling action forces the strip into the narrow space between the fixed knife and the back gauge element, while the simultaneous twisting or spiraling thereof causes such strip to wedge even more securely between these two components because the diagonal dimension of the strip is greater than the width thereof.

Any back gauge assembly of the character referred to above, has a finite range of adjustment, usually such as will permit average expected cut-off operations. Should it become essential to shear off a section of metal plate beyond the capacity of the back gauge assembly, it has been necessary to remove the back gauge assembly with the subsequent necessity of reinstalling the same, when again needed. A back gauge assembly may weigh several hundred pounds, for example, of the order of fifteen hundred or two thousand pounds, from which it becomes apparent that the removal and reinstallation of a back gauge assembly can involve considerable time and labor.

Among the objects of our invention are:

(1) To provide a novel and improved back gauge assembly for shear machines and the like;

(2) To provide a novel and improved back gauge assembly for shear machines and the like, which will eliminate the probability of jamming;

(3) To provide a novel and improved back gauge assembly for shear machines and the like which permits of the shearing or like operation on work in excess of the capacity of the back gauge assembly, and without the necessity of removing such back gauge assembly from the machine;

(4) To provide a novel and improved back gauge assembly for shear machines and the like which will permit of the shearing of plates whose width exceeds the length of the shearing knives and without interference from such back gauge assembly.

Additional objects of our invention will be brought out in the following description of a preferred embodiment of the same as applied to a shear machine, taken in conjunction with the accompanying drawings wherein:

FIG. 3 is a plan view of the back gauge assembly of FIG. 1;

FIG. 4 is a view in section taken in the plane 4—4 of FIG. 1; and

FIG. 5 is a sketch depicting a hydraulic system appropriate to the present invention and to which may be attributed certain new and useful results.

Figure 1:
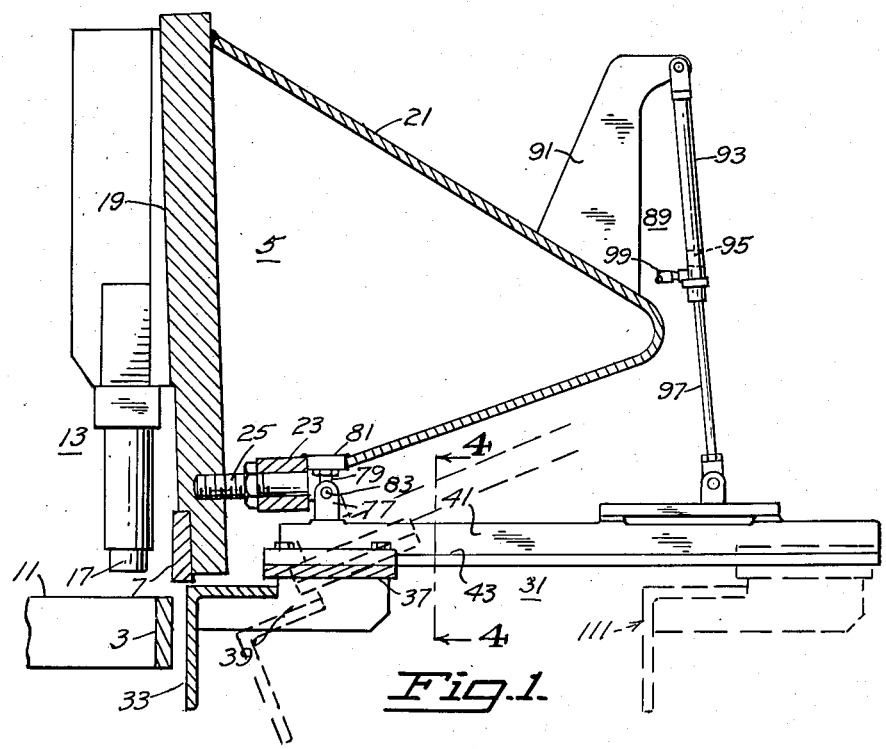
FIG. 1 is a view in section transversely of the shear machine in which the present invention has been incorporated.

Referring to the drawings for details of our invention, we have illustrated the same applied to a shear machine represented by side housings 1, and having a lower fixed knife element 3, a reciprocally mounted ram assembly 5 carrying an upper knife element 7 at a rake angle in shearing relationship to the lower fixed knife element 3 and adapted to cooperate therewith in performing the shearing operation on work 9, a work table 11 adjacent the lower fixed knife element, and hydraulic hold-down means 13 adapted to clamp work to the table in preparation for the shearing operation.

Such hold-down means comprises a plurality of cylinders 15 adapted to receive operating fluid from a source of supply (not shown), each cylinder having a piston 17 supported by a spring 18 and adapted to be driven downwardly into engagement with the work 9 in response to the admission of operating fluid into such cylinder.

The ram assembly, in addition to a ram 19, includes a stiffener for the ram, which in the embodiment illustrated involves an angled sheet 21 of heavy gauge metal welded along its upper edge to the upper edge of the ram and at its lower edge culminating in a reinforcing steel bar 23 to which it is welded and which is provided with bolt openings and bolts 25 for bolting to the lower portion of the ram.

The back gauge assembly 31 comprises a back gauge component 33 preferably of angle iron with one face vertical and the other at right angles thereto, or in a horizontal plane when in functioning position. The back gauge component is affixed to a horizontal mounting plate 37 by means of brackets 39. The mounting plate is slidably mounted for movement in a direction normal to its length, the means for accomplishing this including a screw housing 41 at each end of the back gauge, each of the screw housings constituting an inverted trough having side flanges 43. Toward each end of each screw housing is a bearing assembly for supporting a screw 47 running lengthwise of the housing.

Jibs 51 slidably resting on the housing flanges 43 are bolted to the mounting plate 37 of the back gauge component, thus supporting the back gauge component for sliding movement along the flanges of the screw housings. A traveling nut 53 on each of the screws is provided with a pin connection 55 extending downwardly therefrom to engage the back gauge mounting plate 37 whereby, in response to rotation of the screws, the back gauge component will be caused to travel in a direction normal to its length.

Simultaneous rotation of the screws is required to effect such travel of the back gauge component, and this can be accomplished by an angle gear assembly 59 on the rear end of one of the adjusting screws, and involving a gear casing 61, a bevel gear 63 keyed to the screw shaft and a meshing bevel gear 65. This latter gear is connected to a corresponding angle gear assembly 67 mounted on the rear end of the other adjusting screw, by means of a suitable drive coupling 69. Movement of the back gauge element is effected by either manually adjusting both screws by means of a hand wheel 71 directly mounted on the end of one of the adjusting screws or effecting such adjustment through the use of power means installed in place of the hand wheel, such power means being either hydraulically or otherwise driven.

The back gauge assembly as thus described, is pivotally supported from the ram assembly behind the ram at aligned intermediate points of the back gauge assembly toward the front end thereof, such that the back gauge component will parallel the fixed knife and also intersect the plane of the work supporting table.

In effecting such pivotal connection, a clevis or the like 77 is affixed to the upper surface of the screw housing to receive an eye bolt 79 anchored into a block 81 disposed in an opening in the ram stiffener at the junction of the angle plate 21 and the stiffener bar 23, to both of which the block may be welded. A clevis pin 83 through matching openings in the clevis and the eye bolt completes the pivotal connection between the back gauge assembly and the ram stiffener at each end of the ram assembly.

With the back gauge assembly thus pivotally supported toward its front ends, lifting means 89 are provided for adjustably supporting the back gauge assembly at aligned points toward the rear thereof, whereby the back gauge assembly may be tilted about its pivot axis, from a horizontal position when it is desired to utilize the back gauge component, to an angular position which will cause a withdrawal of the back gauge component to a position further away from the lower or fixed knife element 3.

Such lifting means may involve a plurality of davit shaped brackets 91 extending upwardly from the angled sheet stiffener 21, each to pivotally carry a lifting cylinder 93 and included piston 95 having a piston rod 97 extending through the lower end of the cylinder for pivotal connection to the back gauge assembly.

The cylinder is preferably open to the atmosphere at its upper end but has a hydraulic line connection 99 thereto at its lower end below the piston whereby, upon admission of hydraulic fluid under pressure, a lifting force will be applied to the back gauge assembly. Upon removal of such hydraulic pressure and permitting the line to discharge to the fluid supply source, the back gauge assembly will lower itself by gravity to its horizontal position as determined by a stop 101 within the cylinder to be engaged by the piston when such horizontal position has been reached.

The maximum extent of lift may be determined by the provision of a suitable stop either within the cylinder at a point above the piston, or on the piston rod so as to engage the lower end of the cylinder when the proper limit has been reached.

The permissible tilt of the back gauge assembly as provided for in the above-described structure, not only now makes it possible to easily relieve jamming, should such jamming occur, but of considerably greater importance, is the fact that by incorporating the hydraulic components associated with the back gauge assembly into the hydraulic system of the machine and timing the operation thereof to the operation of the hold-down means, the back gauge element may be automatically withdrawn from its gauging position prior to the actual shearing of the metal, whereby jamming can never occur.

By taking advantage of the great predominance of load on the pistons of the back gauge assembly as compared with the relative light spring load on the pistons of the hold-down devices, proper correlation between the operation of the hold-down means and the lifting means of the back gauge assembly to obtain proper timing, can be accomplished in a most simple manner.

Toward this end, the hold-down cylinders 15 and the lifting cylinders 93 are supplied from a common supply line 105. Due to the fact that the fluid to the hold-down cylinders must initially overcome merely the loading due to springs 18 which serve to normally hold the included pistons above the work table, while that fluid which flows into the lifting cylinders must overcome considerable weight before lifting the back gauge assembly, it becomes obvious that the hold-down pistons will move into engagement with the work before any lifting of the back gauge assembly can occur.

Following such engagement of the work by the hold-down pistons, the hydraulic pressure will build up in both the hold-down cylinders and the lifting cylinders until that pressure is reached which will enable the lifting means to function in raising the back gauge assembly until the maximum permissible lifting position is reached and no further lifting can occur. At this point, because neither the hold-down pistons nor the lifting pistons can travel further, pressure will continue to build up in all the cylinders, which results in a more effective clamping of the work to the table. Inasmuch as full clamping pressure of the hold-down means in a normal machine is timed to occur before shearing, as disclosed in the patent to Pearson et al. for Hydraulic Hold-Down for Reciprocating Ram, No. 2,781,844 of Feb. 19, 1957, for example, it becomes apparent that by the time the upper knife element engages the work for a shearing operation in the present machine, the work will have been securely clamped to the table and the back gauge assembly will have been withdrawn from its position of engagement by the work, and the severed portions of the work will accordingly be free to drop.

Such freedom offers an additional advantage in that it opens up the possibility of shearing narrow strips without jamming, from metal plate having a dimension parallel to the shearing knives, whereby more than one shearing operation is required to sever a thin strip portion therefrom.

It frequently happens also, that a portion must be severed from a metal plate, which portion exceeds the capacity of the back gauge assembly. Inasmuch as a conventional back gauge element would stand in the way of such work being properly positioned in the machine, it would become necessary to remove the back gauge assembly from such machine.

Figure 2:
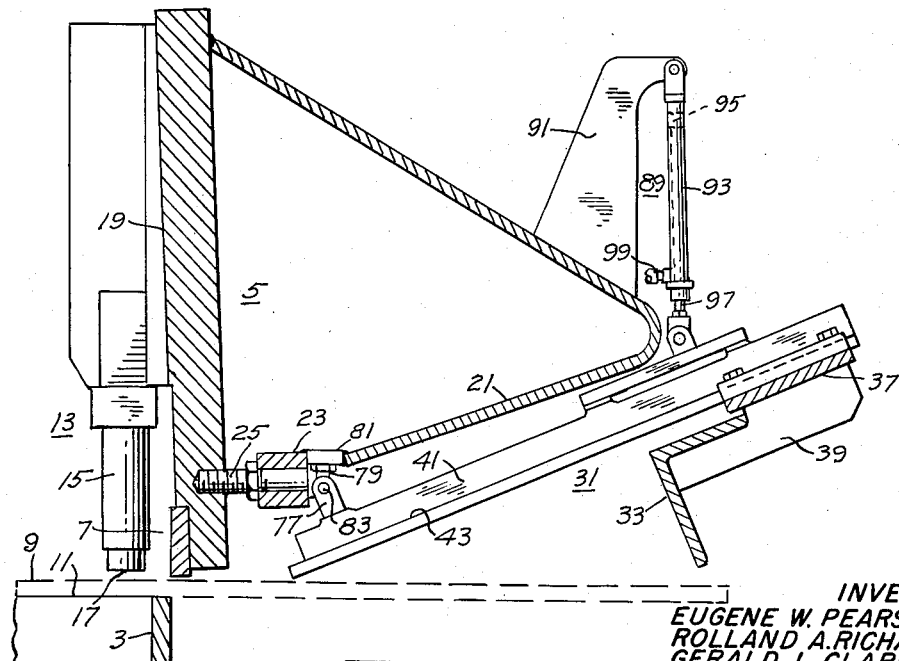
FIG. 2 is a view depicting a positional adjustment of the back gauge assembly of FIG. 1 to illustrate an advantage arising out of the present invention.

In accordance with the present invention, this is no longer necessary, for by initially adjusting the back gauge component to a position 111 toward the rear of the back gauge assembly, then in response to the tilting of the back gauge assembly, the entire back gauge assembly, including the back gauge component, will be lifted above the plane of the table sufficiently to open a free path for movement of the work through the machine to any extent desired, as depicted in FIG. 2.

To retain the back gauge assembly in its uppermost position for such latter mode of operation, we provide a valve 113, preferably of the needle valve type, in the supply line 105 at a location between the hold-down means 13 and the lifting means 89 whereby, upon closing such valve, the lifting pistons 97 will retain their status quo.

This has its advantages also in shearing operations within the capacity of the back gauge assembly where the problem of jamming would not normally be expected as when severing large pieces from the work. In such cases, sequence tilting of the back gauge assembly would have no advantage and could thereby be dispensed with by closing valve 113.

From the foregoing, it will be apparent that the invention fulfills all the objects attributed thereto, and while we have illustrated and described the same in its preferred form as applied to a shear machine, it will be apparent that the invention is subject to alteration and modification without departing from the underlying principles involved and we accordingly do not desire to be limited in our protection to the specific details thus illustrated and described, except as may be necessitated by the appended claims.

We claim:

1. In a shear machine or the like having a fixed knife element, a reciprocal ram assembly carrying a knife element adapted to cooperate with said fixed knife element in performing an operation on work, a work table adjacent said fixed knife element and hydraulic hold-down means adapted to clamp work to said table in preparation for such operation and comprising a plurality of cylinders adapted to receive operating fluid from a source and each cylinder having a piston adapted to be driven into engagement with such work in response to admission of operating fluid into such cylinders; a back gauge assembly including a back gauge component; means supporting said back gauge assembly with said back gauge component behind and substantially paralleling said fixed knife element and intersecting the plane of said table; means for withdrawing said back gauge component to a position further removed from said fixed knife element following engagement of such work by said hold-down means and prior to contact of said work by said ram carried knife; and means for moving said back gauge assembly out of the plane of said table and rendering same inactive, to permit shearing of work beyond the capacity of said back gauge assembly to handle.

2. In a shear machine or the like having a lower fixed knife element, a reciprocal ram assembly carrying an upper knife element at a rake angle in shearing relationship to said lower fixed knife element and adapted to cooperate therewith in performing an operation on work, a work table adjacent said lower fixed knife element and hydraulic hold-down means adapted to clamp work to said table in preparation for a shearing operation and comprising a plurality of cylinders adapted to receive operating fluid from a source and each cylinder having a piston adapted to be driven downwardly into engagement with such work in response to admission of operating fluid into said cylinders; a back gauge assembly including a back gauge component; means supporting said back gauge assembly with said back gauge component behind and substantially paralleling said fixed knife element and intersecting the plane of said table; and hydraulic means functioning independently of said ram assembly for withdrawing said back gauge component to a position further removed from said fixed knife element following engagement of such work by said hold-down means and in response thereto; and means for moving said back gauge assembly to a position out of the plane of said table and rendering same inactive, to permit shearing of work beyond the capacity of said back gauge assembly to handle.

3. In a shear machine or the like having a lower fixed knife element, a reciprocal ram assembly carrying an upper knife element at a rake angle in shearing relationship to said lower fixed knife element and adapted to cooperate therewith in performing an operation on work, a work table adjacent said lower fixed knife element and hydraulic hold-down means adapted to clamp work to said table in preparation for a shearing operation and comprising a plurality of cylinders adapted to receive operating fluid from a source and each cylinder having a piston adapted to be driven downwardly into engagement with such work in response to admission of operating fluid into said cylinders; a back gauge assembly including a back gauge component; means supporting said back gauge assembly with said back gauge component behind and substantially paralleling said fixed knife element and intersecting the plane of said table; and hydraulic means functioning independently of said ram assembly for withdrawing said back gauge component to a position further removed from said fixed knife element following engagement of such work by said hold-down means and in response thereto; means for moving said back gauge assembly to a position out of the plane of said table; and means for stabilizing said position to permit shearing of work beyond the capacity of said back gauge assembly to handle.

4. In a shear machine or the like having a lower fixed element, a reciprocal ram assembly carrying an upper element adapted to cooperate with said lower fixed element in performing an operation on work, a work table adjacent said lower fixed element and hydraulic hold-down means adapted to clamp work to said table in advance of such operation; a back gauge assembly comprising a back gauge component, means for mounting said back gauge component for movement in a direction normal to its length; means pivotally securing said back gauge assembly at aligned intermediate points thereof to said reciprocal ram assembly with said back gauge component behind and substantially paralleling said lower fixed element and intersecting the plane of said table; vertical lifting means carried by said reciprocal ram assembly and coupled to said back gauge assembly rearwardly of said aligned pivot points, said vertical lifting means including a plurality of aligned brackets mounted on said ram assembly, a cylinder pivotally supported by each of said brackets, and means including a piston in each of said cylinders, coupled to said back gauge assembly at one of said rearwardly located points; and means for sequentially actuating said hold-down means and said back gauge assembly lifting means.

5. In a shear machine or the like having a lower fixed element, a reciprocal ram assembly carrying an upper element adapted to cooperate with said lower fixed element in performing an operation on work, a work table adjacent said lower fixed element and hydraulic hold-down means adapted to clamp work to said table in advance of such operation and comprising a plurality of cylinders adapted to receive operating fluid from a source and each cylinder having a piston adapted to be driven downwardly into engagement with such work in response to admission of operating fluid into such cylinders; a back gauge assembly comprising a back gauge component of a length of the order of said ram, means for slidably mounting said back gauge component for movement in a direction normal to its length, said means including a screw housing at each end of said back gauge component, each of said screw housings having side flanges, a screw running lengthwise of each of said housings and rotatably mounted for rotation, gibs resting on said housing flanges and coupled to said back gauge component, a traveling nut on each of said screws and in drive connection to said back gauge component, means for simultaneously adjusting both said slidable mounting means; means pivotally securing said back gauge assembly at aligned intermediate points thereof to said reciprocal ram assembly with said back gauge component behind and substantially paralleling said lower fixed element and intersecting the plane of said table; vertical lifting means carried by said reciprocal ram assembly and coupled to said back gauge assembly at aligned points rearwardly of said aligned pivot points, said vertical lifting means including a plurality of aligned brackets mounted on said ram assembly, a cylinder pivotally suspended from each of said brackets, and a piston in each of said cylinders coupled to said back gauge assembly at one of said rearwardly located points; and means for sequentially actuating said hold-down means and said back gauge assembly lifting means.

6. In a shear machine or the like having a lower fixed knife element, a reciprocal ram assembly carrying an upper knife element at a rake angle in shearing relationship to said lower fixed knife element and adapted to cooperate therewith in performing an operation on work, a work table adjacent said lower fixed knife element and hydraulic hold-down means adapted to clamp work to said table in advance of a shearing operation and comprising a plurality of cylinders adapted to receive operating fluid from a source and each cylinder having a piston adapted to be driven downwardly into engagement with such work in response to admission of operating fluid into such cylinders; a back gauge assembly comprising a back gauge component of a length of the order of said ram and including a mounting plate, means for slidably mounting said back gauge component for movement in a direction normal to its length, said means including a screw housing at each end of said back gauge component, each of said screw housings having side flanges and a bearing assembly at each end, a screw running lengthwise of each of said housings and journalled in said bearings, gibs resting on said housing flanges and connected to the mounting plate of said back gauge component, a traveling nut on each of said screws, and a connection from said traveling nut to said back gauge mounting plate, means for simultaneously adjusting both said slidable mounting means, said simultaneous adjusting means including means connected to one of said screws for rotating the same and a drive coupling between said rotating means and said other screw; means pivotally securing said back gauge assembly at aligned intermediate points thereof to said reciprocal ram assembly with said back gauge component behind and substantially paralleling said fixed knife element and intersecting the plane of said table; vertical lifting means carried by said reciprocal ram assembly and coupled to said back gauge assembly at aligned points rearwardly of said aligned pivot points, said vertical lifting means including a plurality of aligned brackets mounted on said ram assembly; a cylinder pivotally suspended from each of said brackets, and a piston in each of said cylinders coupled to said back gauge assembly at one of said rearwardly located points; and means for sequentially actuating said hold-down means and said back gauge assembly lifting means.

7. In a shear machine or the like having a fixed knife element, a reciprocal ram assembly carrying a knife element adapted to cooperate with said fixed knife element in performing an operation on work, and means adapted to immobilize work in advance of such operation; a back gauge assembly including a back gauge component; means supporting said back gauge assembly with said back gauge component substantially paralleling said fixed knife element in substantially the plane of work to be operated on; means for withdrawing said back gauge component to a position further removed from said fixed knife element; and means responsive to operation of said work immobilizing means for actuating said back gauge component withdrawing means.

8. In a shear machine or the like having a fixed element, a reciprocal ram assembly carrying an element adapted to cooperate with said fixed element in performing an operation on work, and hydraulic means adapted to immobilize work in advance of such operation; a back gauge assembly including a back gauge component; means supporting said back gauge assembly with said back gauge component substantially paralleling said fixed element in substantially the plane of work to be operated on; hydraulic means for withdrawing said back gauge component to a position further removed from said fixed element; and means responsive to pressures developed by said work immobilizing means for actuating said back gauge component withdrawing means.

9. In a shear machine or the like having a fixed element, a reciprocal ram assembly carrying an element adapted to cooperate with said fixed element in performing an operation on work, a work table adjacent said fixed element and hydraulic hold-down means in front of said ram assembly and adapted to clamp work to said table in advance of such operation; a back gauge assembly including a back gauge component and means for adjusting said back gauge in a direction normal to its length; means pivotally securing said back gauge assembly at aligned intermediate points thereof to said reciprocal ram assembly with said back gauge component behind and substantially paralleling said fixed element and intersecting the plane of said table; hydraulic means carried by said ram assembly and connecting to said back gauge assembly for tilting said back gauge assembly to withdraw said back gauge component to a position further removed from said fixed element when said tilting means is actuated, said back gauge assembly requiring greater hydraulic pressure for tilting the same than is required for functioning of said hold-down means; and means for sequentially actuating said hold-down means and said back gauge assembly tilting means, said means including a common source of hydraulic pressure for both said hold-down means and said hydraulic tilting means, in conjunction with the greater load on said hydraulic tilting means as compared to the load on said hold-down means; and means for retaining said back gauge assembly in any position within its permissible range of movement.

10. In a shear machine or the like having a lower fixed knife element, a reciprocal ram assembly carrying an upper knife element at a rake angle in shearing relationship to said lower fixed knife and adapted to cooperate therewith in performing an operation on work, a work table adjacent said lower fixed knife element and hydraulic hold-down means in front of said ram assembly and adapted to clamp work to said table in advance of a shearing operation and comprising a plurality of cylinders adapted to receive operating fluid from a source and each cylinder having a piston adapted to be driven downwardly into engagement with such work in response to admission of operating fluid into such cylinders; a back gauge assembly including a back gauge component; means pivotally securing said back gauge assembly at aligned intermediate points thereof to said reciprocal ram assembly with said back gauge component behind and substantially paralleling said fixed knife element and intersecting the plane of said table; hydraulic means carried by said ram assembly and connecting to said back gauge assembly for tilting said back gauge assembly to withdraw said back gauge component to a position further removed from said fixed knife element when said tilting means is actuated, said back gauge assembly requiring greater hydraulic pressure for tilting the same than is required for the functioning of said hold-down means; and means for sequentially actuating said hold-down means and said back gauge assembly tilting means, said means including a common source of hydraulic pressure for both said hold-down cylinders and said hydraulic tilting means, in conjunction with the greater load on said hydraulic tilting means as compared to the load on each hold-down cylinder; and means for retaining said back gauge assembly in any position within its permissible range of movement, said means including a valve in the flow path to said hydraulic means to the exclusion of the flow path to said hold-down means.

11. In a shear machine or the like having a lower fixed knife element, a reciprocal ram assembly carrying an upper knife element at a rake angle in shearing relationship to said lower fixed knife and adapted to cooperate therewith in performing an operation on work, a work table adjacent said lower fixed knife element and hydraulic hold-down means in front of said ram assembly and adapted to clamp work to said table in advance of a shearing operation and comprising a plurality of cylinders adapted to receive operating fluid from a source and each cylinder having a piston adapted to be driven downwardly into engagement with such work in response to admission of operating fluid into such cylinders; a back gauge assembly including a back gauge component and means for adjusting said back gauge component in a direction normal to its length; means pivotally securing said back gauge assembly at aligned intermediate points thereof to said reciprocal ram assembly with said back gauge component behind and substantially paralleling said fixed knife element and intersecting the plane of said table; vertical lifting means carried by said ram assembly and connecting to said back gauge assembly for tilting said back gauge assembly to withdraw said back gauge component to a position further removed from said fixed knife element when said lifting means is actuated, said lifting means including a plurality of cylinders and included pistons adapted to be hydraulically driven when fluid is admitted to said cylinders and requiring greater hydraulic pressure to tilt said back gauge assembly than is required for the functioning of said hold-down means; and means for sequentially actuating said hold-down means and said back gauge assembly lifting means, said means including a common source of hydraulic pressure for both said hold-down cylinders and said lifting cylinders, in conjunction with the greater load on each lifting cylinder as compared to the load on each hold-down cylinder; and means for retaining said back gauge assembly in any position within its permissible range of movement, said means including a valve in a supply line to said lifting means.

12. In a shear machine or the like having a fixed element, a reciprocal ram assembly carrying an element adapted to cooperate with said fixed element in performing an operation on work, a work table adjacent said lower fixed element and hydraulic hold-down means adapted to clamp work to said table in advance of such operation; a back gauge assembly including a back gauge and means for adjusting said back gauge in a direction normal to its length; hydraulically driven means securing said back gauge assembly to said reciprocal ram assembly with said back gauge behind and substantially paralleling said fixed element and said hydraulically driven means being adapted to move said back gauge from a gauging position to a position further removed from said fixed element, the hydraulic pressure required to move said back gauge being greater than that required to operate said hold-down means; and means for sequentially actuating said hold-down means and said back gauge moving means, said sequentially actuating means comprising a hydraulic system including a source of pressure and both said hold-down means and said back gauge moving means, in conjunction with the greater pressure required by said back gauge moving means.

13. In a shear machine or the like having a fixed element, a reciprocal ram assembly carrying an element adapted to cooperate with said fixed element in performing an operation on work, a work table adjacent said lower fixed element and hydraulic hold-down means adapted to clamp work to said table in advance of such operation; a back gauge assembly including a back gauge and means for adjusting said back gauge in a direction normal to its length; hydraulically driven means securing said back gauge assembly to said reciprocal ram assembly with said back gauge behind and substantially paralleling said fixed element and said hydraulically driven means being adapted to move said back gauge from a gauging position to a position further removed from said fixed element, the hydraulic pressure required to move said back gauge being greater than that required to operate said hold-down means; and means for sequentially actuating said hold-down means and said back gauge moving means, said sequentially actuating means comprising a hydraulic system including a source of pressure and both said hold-down means and said back gauge moving means, in conjunction with the greater pressure required by said back gauge moving means; and means for retaining said back gauge in any position within its permissible range of movement, said means including a valve in said hydraulic system between said back gauge moving means and said source.

References Cited in the file of this patent

UNITED STATES PATENTS

| | | |
|---|---|---|
| 272,202 | Bradley | Feb. 13, 1883 |
| 445,294 | Treat | Jan. 27, 1891 |
| 450,147 | Gill | Apr. 14, 1891 |
| 2,047,322 | Hazelton | July 14, 1936 |
| 2,125,539 | Brownlee | Aug. 2, 1938 |
| 2,269,328 | Williamson | Jan. 6, 1942 |
| 2,520,495 | Dehn | Aug. 29, 1950 |
| 2,534,292 | Mueller | Dec. 19, 1950 |
| 2,603,291 | Williams | July 15, 1952 |
| 2,639,771 | Kobler | May 26, 1953 |
| 2,854,733 | Smith | Oct. 7, 1958 |

FOREIGN PATENTS

| | | |
|---|---|---|
| 792,267 | Great Britain | Mar. 26, 1958 |
| 805,806 | Great Britain | Dec. 10, 1958 |